United States Patent [19]

Guibert

[11] Patent Number: 4,478,519
[45] Date of Patent: Oct. 23, 1984

[54] AUTOMATIC PASTE-PRODUCING APPARATUS

[76] Inventor: Raul Guibert, 10374 Summer Holly Cir., Los Angeles, Calif. 90024

[21] Appl. No.: 359,768

[22] Filed: Mar. 19, 1982

Related U.S. Application Data

[63] Continuation-in-part of Ser. No. 272,344, Jun. 10, 1981.

[51] Int. Cl.³ .......................... B01F 7/24; B01F 15/02
[52] U.S. Cl. .................................... 366/157; 366/139; 366/160; 366/178; 366/181; 366/182; 366/318; 99/454; 99/472
[58] Field of Search ...................... 366/69, 76, 79, 81, 366/82, 87, 90, 98, 134, 138, 139, 147, 150, 155, 156, 157, 165, 167, 168, 169, 172, 173, 293, 295, 160, 178, 181, 182, 318, 324; 426/486, 487; 99/348, 454, 472

[56] References Cited

U.S. PATENT DOCUMENTS

| | | |
|---|---|---|
| 1,956,615 | 5/1934 | Hansen . |
| 3,521,863 | 7/1970 | Graham . |
| 3,651,768 | 3/1972 | Hyppola . |
| 3,804,303 | 4/1974 | Fassauer . |
| 3,868,093 | 2/1975 | Sokolow . |
| 4,352,567 | 10/1982 | Guibert ................................. 366/76 |

Primary Examiner—Harvey C. Hornsby
Assistant Examiner—Michael Knick
Attorney, Agent, or Firm—Michael Ebert

[57] ABSTRACT

An automatic paste-producing apparatus which includes a vertical assembly constituted by a tubular chamber whose upper end communicates with a metering tube of enlarged diameter to which flour or other powder is supplied. Coaxially mounted within the assembly is a rotating shaft having a main screw section of uniform diameter operating within the chamber and a conical screw section operating within the metering tube. Slidable within the metering tube is a ring which surrounds the conical screw section to define an annular valve orifice, the ring being axially shiftable to set the size of the orifice. The flour admitted into the chamber by the metering tube is hurled by the main screw section against the inner wall of the chamber to create a thin powder film thereon which is then intermixed with a liquid to form a paste, air being drawn from the chamber through the main screw section to control the entrainment of air within the paste.

8 Claims, 1 Drawing Figure

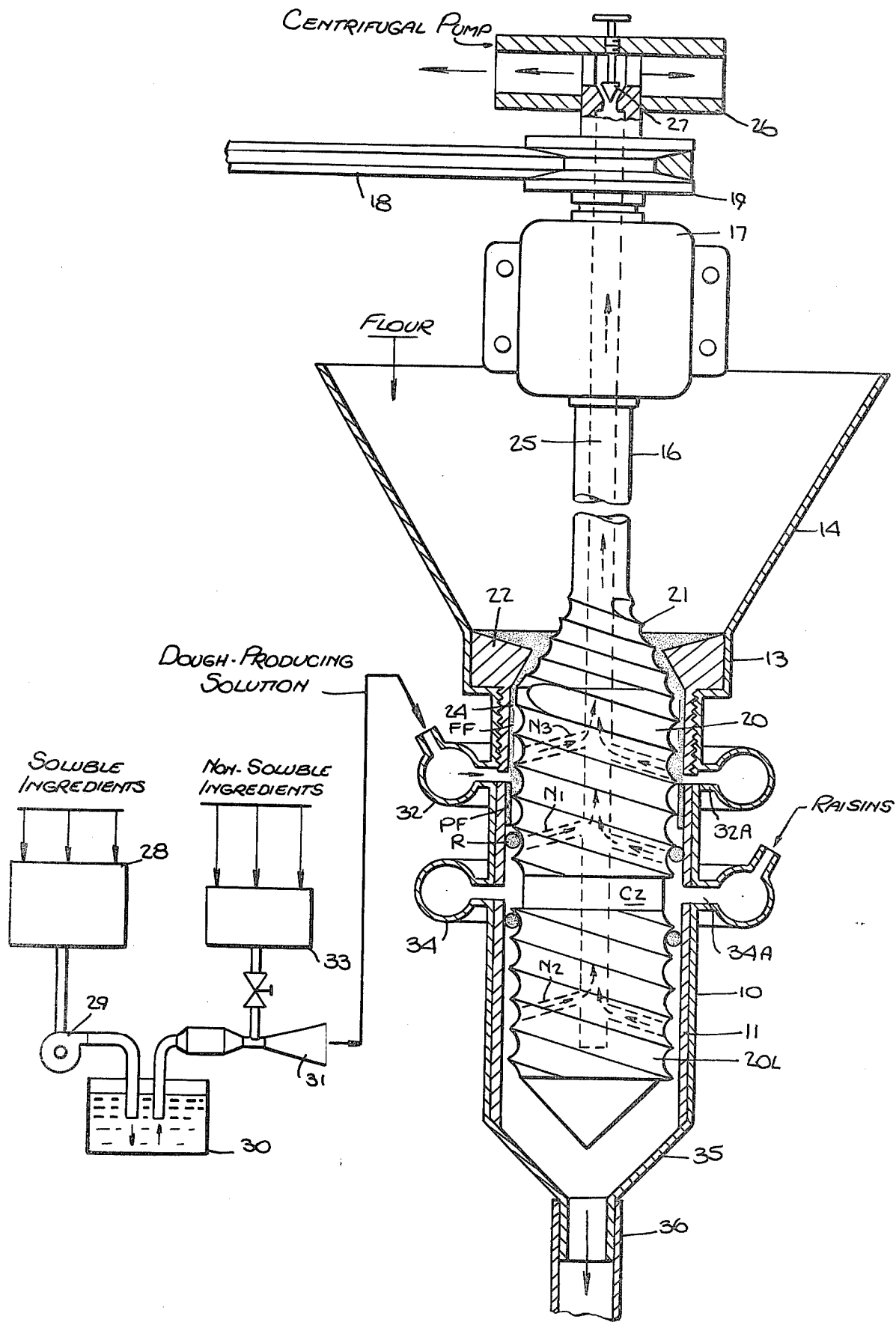

AUTOMATIC PASTE-PRODUCING APPARATUS

RELATED APPLICATION

This application is a continuation-in-part of my copending application Ser. No. 272,344, filed June 10, 1981, entitled "Automatic Dough-Processing Apparatus," the entire disclosure thereof being incorporated herein by reference.

BACKGROUND OF INVENTION

This invention relates generally to mechanisms for mixing a powder with a liquid to form a homogeneous paste, and more particularly to a high-speed, fully automatic apparatus for this purpose in which the liquid and powder are intermixed within a chamber from which air is withdrawn to control the entrainment of air in the paste.

While the invention will be described in connection with the production of dough for making bakery products such as bread, pizza and pastry, it is to be understood that the mixing mechanism included in the apparatus has many other practical applications unrelated to bakery products.

From the standpoint of production volume, bread is the most important baked product. Mixing is the first active step in bread production. The ingredients involved in mixing are flour and a dough-forming solution constituted typically by water, yeast, sugar, salt, milk and shortening. Ideally, mixing should result in a uniform mixture forming a smooth dough; it should develop the gluten in the dough in order to promote the elasticity of the dough and permit it to retain the gases generated by the yeast; and it should distribute the yeast cells uniformly so that they will receive proper nutrition.

The fact that dough can be rapidly produced has been confirmed by Bernadin et al. in their article "Hydrated Protein Fibrils from Wheat Endosperm" in the periodical *Cereal Chemistry*—September—October 1968, Vol. 50, No. 5. This article points out that flour hydration occurs very rapidly; for wetting a single particle of flour in a droplet of water requires less than 0.05 sec. for complete hydration, a hydrated protein web spreading quickly from the particle. Adjacent flour particles spreading similar protein networks interact to form a continuous system that can be worked mechanically to form a dough-like mass.

In traditional techniques for producing dough, such as the batch method which uses heavy blades revolving in a large bowl to mix the flour and dough-forming solution into a homogeneous mass, a number of steps must be separately performed which render the process time-consuming and costly. Moreover, the resultant dough is not entirely homogeneous, giving rise to non-uniform dough balls and a final baked product of unpredictable consistency.

In my prior U.S. Pat. No. 3,888,997, entitled "Method and Apparatus for Processing Dough," there is disclosed a mechanism operating at exceptionally high speed to effect continuous mixing, all necessary steps being carried out automatically from the initial step of feeding the flour and the dough-forming solution into the machine to the final step of forming divided units of the processed dough ready for baking. This patented mechanism obviates many of the drawbacks experienced with conventional techniques. In my prior patent, a screw rotating within a vertical tubular chamber acts to centrifugally hurl flour fed into the chamber against the inner wall thereof, thereby depositing a thin film of flour on the inner wall. Also fed into the chamber is the dough-forming solution which admixes with the thin film of flour to form on the inner wall a pasty film which is directed downwardly along a helical path. The pasty film is scraped from the inner wall to produce a downwardly-extending ribbon that is subjected to a kneading action.

The flour fed into the mixing chamber is introduced therein through a hopper having an outlet of fixed dimensions. The practical difficulty with this fixed feed arrangement is that it fails to take into account the changing flowability of flour with variations in ambient temperature and humidity. It also does not accommodate the feed to the disparate characteristics of various flours. One, therefore, is not always able to attain optimum flour flow conditions.

Flour, which is a finely ground meal of wheat, is the backbone and structure of baked goods, flour acting both as a binding and absorbing agent. Wheat is the only cereal that contains the proper combination of glutenin and gliaden for bread-making. When combined with water, these constituents form gluten which is essential for retaining the gas produced by yeast.

However, the form of wheat used depends on the ultimate product. Thus there are several kinds of so-called hard wheat, the choice depending on the final product (i.e., rolls or bread). Cakes and cookies are derived from various types of soft wheat. In some instances, rye flour milled from rye grain may be blended into wheat flour.

The need exists, therefore, for means to adjust the feed of flour in an arrangement of the type disclosed in my prior patent to accommodate the machine to changing ambient conditions and to different flour characteristics. In my copending application, means are provided to adjust the input feed of flour so that the rate of feed takes into account the characteristics of the flour and the prevailing ambient conditions.

In my prior patent and in my copending application, the dough-producing solution is admitted through a channel cut in the shaft on which the main screw is mounted. This channel communicates with nozzles formed in the rotating screw from which the solution is ejected against the thin film of flour to admix therewith, thereby forming a paste that is thereafter developed by a screw action to produce dough.

The present invention is limited to the mixing of powder such as flour and a liquid, the subsequent steps of development, proofing, etc., not being the concern of the present invention.

When the liquid is introduced in the manner disclosed in my prior patent and copending application and is hurled centrifugally against a thin film of flour, this turbulent jet action tends to entrain air in the resultant paste.

While the existence of some air bubbles in the paste does not adversely affect the quality of the dough produced from the paste, an excessive amount of such bubbles may be undesirable in some instances.

Thus in the making of dough by the conventional batch process, the present practice includes the use of degassers which roll or otherwise manipulates the dough to squeeze out large air bubbles therefrom. And in order to produce a so-called "strong" or coherent dough that will not separate when handled, it is also the common practice to add oxidizing agents therein such as potassium bromide or ascorbic acid.

While it is desirable, depending on the end product, to have minute air bubbles well dispersed throughout the dough, the existence of large bubbles therein is usually objectionable. There is no optimum dispersion of air bubbles that is applicable to all doughs, for the bubble requirements depend on the ultimate products; hence some degree of or control or flexibility is required in producing a paste from which the dough is to be made.

SUMMARY OF INVENTION

In view of the foregoing, the main object of this invention is to provide an automatic paste-producing apparatus useful in the production of dough and other products in which water or other liquid is admixed with flour or other powder in a manner affecting a rapid mixing action to produce a paste in a manner in which the amount of air entrained therein is controllable to produce a dough having desired characteristics.

A significant feature of the invention resides in the fact that the amount of air entrained in the paste in the course of the mixing action is controllable to provide a dough having whatever strength and other characteristics are desired.

More particularly, an object of this invention is to provide a mixing apparatus in which the incoming powder is caused by a screw rotating within a cylindrical chamber to form a thin powder film on the inner wall of the chamber, the film being admixed with liquid to create a paste, air in the space between the rotating screw and chamber wall being evacuated to a degree limiting air entrainment.

Still another object of the invention is to provide a mixing apparatus whose chamber includes not only a liquid inlet but also an inlet to introduce non-soluble ingredients such as raisins, to be mixed with the paste.

Also an object of the invention is to provide paste-producing apparatus for mixing powder with a liquid which operates efficiently and reliably and which can be mass-produced at relatively low cost, the mixer being highly compact.

Briefly stated, these objects are accomplished in an automatic paste-producing apparatus which includes a vertical assembly constituted by a tubular chamber whose upper end communicates with a metering tube of enlarged diameter to which flour or other powder is supplied. Coaxially mounted within the assembly is a rotating shaft having a main screw section of uniform diameter operating within the chamber and a conical screw section operating within the metering tube. Slidable within the metering tube is a ring which surrounds the conical screw section to define an annular valve orifice, the ring being axially shiftable to set the size of the orifice. The flour admitted into the chamber by the metering tube is hurled by the main screw section against the inner wall of the chamber to create a thin powder film thereon which is then intermixed with a liquid to form a paste, air being drawn from the chamber through the main screw section to control the entrainment of air within the paste.

OUTLINE OF DRAWING

For a better understanding of the invention as well as other objects and further features thereof, reference is made to the following detailed description to be read in conjunction with the accompanying drawing whose single FIGURE illustrates in section a mixing apparatus in accordance with the invention.

DESCRIPTION OF INVENTION

Referring now to the drawing, there is shown a mixing apparatus in accordance with the invention for mixing a powder with a liquid. When the apparatus is to be used to produce a dough, the powder is flour and the liquid is a dough-forming solution; but for other types of powders, the liquid is appropriate to the nature of the powder.

The apparatus includes a vertically-mounted assembly in the form of a cylindrical casing 10 having an inner liner 11 therein, the upper end of the chamber being joined to and communicating with a metering tube 13 of enlarged diameter. Integral with tube 13 is a conical hopper 14 for feeding the powder into the chamber. With the exception of the liner, the assembly is preferably fabricated of stainless steel or other high strength material that is non-reactive with the ingredients being processed. Liner 11 is preferably fabricated of a low friction, non-ferrous material such as Teflon (PTFE). The assembly is supported by a fixture (not shown) which in practice may be formed by a pair of complementary semi-cylindrical half pieces clamped about the chamber by suitable bolts.

Coaxially disposed within the assembly is a rotatable shaft 16 whose upper portion extends above hopper 14, the shaft being supported by a suitable bearing 17. The shaft is motor-driven at high speed through a belt 18 coupled to a pulley 19 keyed to the shaft.

Since the mixing action involves centrifugal force, one must bear in mind that centrifugal force depends on the weight and mass of the body as well as gravity and is a linear function of the distance from the axis about which the body is rotating and the square of the angular velocity of the body about the axis of rotation. We have found that for a two-inch diameter screw, an adequate centrifugal force is produced at a rate of rotation of 3500 RPM. In order, therefore, to operate the mixer at a lower speed, say, 2,500 TPM with the same force, a larger diameter unit may be used.

Shaft 16 includes a main screw section 20 of uniform diameter which has a single or multiple-helix thread and is disposed within chamber 10 of the assembly. Above main screw section 20 is a feeder section 21 which has a conical formation and a single or multi-helix thread, the feeder section lying within metering tube 13.

Slidable within metering tube 13 and surrounding feeder section 21 is a ring 22 whose inlet has a conical formation to the orifice of a valve defined by the ring and the feeder section. The axial position of the ring relative to the feeder section is adjustable to set the size of the orifice, this being effected by a ring extension sleeve 24 which is externally-threaded and rotatable within the internally-threaded wall at the upper end of chamber 10. By raising or lowering ring 22, one may provide a valve orifice of the desired size.

Shaft 16 has cut therein a longitudinally-extending channel 25, the upper end of the shaft being coupled to a centrifugal suction pump 26 which is rotated by the shaft and acts, as it were, to hurl air therefrom and thereby create a negative pressure to draw air from channel 25. The degree of suction is adjustable by means of a valve 27 at the inlet to channel 25.

The dough-forming solution is prepared by feeding the soluble ingredients thereof (water, yeast, salt, etc.) into one or more solution hoppers 28 feeding a mixing pump 29 in which the ingredients are agitated and intermingled, the pump discharging the solution into a buffer tank 30. Tank 30 serves to stabilize the solution and effectively filter out the pulsations produced by the pumping action.

The output of tank 30 is fed through a Venturi tube 31 into the liquid inlet 32 for chamber 10. Non-soluble ingredients such as shortening oils may be supplied to the throat of the Venturi tube through a hopper 33 to intermingle with the solution.

Liquid inlet 32 is in the form of a toroidal housing surrounding an annular slot 32A in the cylindrical chamber 10 adjacent its upper end, the inlet slot being at a point at which the incoming liquid admixed with a film of flour or powder formed in the inner wall of the chamber. At about the midpoint of screw 20, the screw is relieved to define a collection zone CZ, the chamber at this point having a second inlet slot 34A surrounded by a toroidal housing 34 to which non-soluble ingredients such as whole wheat grains and raisins are fed to intermix with the paste collected in zone CZ.

In operation, flour entering the uppermost flight of main screw 20 on the shaft in chamber 10 is directed downwardly into a film-forming zone in the uppermost portion of chamber 10. Because of the high speed of the shaft, the particles of flour are centrifugally hurled outwardly against the surface of inner liner 11 to form thereon a thin, downwardly-moving cylindrical flour film FF. Any flour particles coming in contact with the trough surfaces of the flights of main screw 20 will instantly be thrown outwardly at high speeds to bombard and admix with flour film FF. The dough-forming solution is admitted into the chamber through inlet slot 32A just below the film-forming zone and is admixed with the flour film FF to form a pasty, homogeneous mass PF in film form, the pasty film being advanced down the chamber.

The pasty film PF is now worked by the flight of screw 20 whose outer peaks engage the moist mass and shape it into a ribbon R of almost circular cross section, the ribbon being advanced into collection zone CZ in which the paste is admixed with non-soluble ingredients fed through inlet slot 34A. From this zone, the lower section 20L of the screw acts as an extruder and again produces a ribbon which is advanced toward the conical outlet 35 of the chamber from which the paste in the case of dough production is conducted through pipe 36 to a development stage. Because the paste ribbon advanced by screw section 20L contains solids, such as raisins, the pitch of this section may be larger than the upper section of the screw.

The screw 20 is preferably stainless steel and the liner 11 is of PTFE, low friction material. The difference in the coefficients of friction of these materials creates a torque to rotate ribbon R. Some degree of development occurs in the region within the chamber below collection zone CZ; and in practice, if lower screw section 20L is of adequate length, the paste may be developed therein into dough without the need for a separate development stage.

It is to be noted that the shaft channel 25 communicates with a set of nozzles $N_1$ below solution inlet 32 and also with a set of nozzles $N_2$ in the lower screw section 20L. Nozzles $N_1$ serve to draw air out of the space between liner 11 and screw 20 just at about the point at which the flour mixes with the liquid to control entrainment of air in the paste being worked in the chamber without interfering with the mixing action. The amount of suction is adjustable by valve 27; hence one can control the amount of air admitted into the paste and thereby provide a dough having desired properties.

The second set of nozzles $N_2$ serve to produce a negative pressure in the chamber which assists the flow of flour therein and acts in conjunction with the force of gravity. In practice, a third set of nozzles $N_3$ may be located just about the liquid inlet 32A to act on the admission of flour.

While there has been shown and described a preferred embodiment of an automatic paste-producing apparatus in accordance with the invention, it will be appreciated that many changes and modifications may be made therein without, however, departing from the essential spirit thereof. Thus, instead of sucking air from the apparatus to control the amount thereof entrained in the paste, air or a gas such as carbon dioxide or nitrogen may be blown into the apparatus to be entrained into the paste and thereby obviate the need for yeast or other means to generate gas bubbles within the paste to produce a dough of the desired quality.

I claim:

1. Apparatus for mixing powder with liquid to produce a homogeneous paste, said apparatus comprising:
   (A) a vertical cylindrical chamber provided with means at its upper end portion to feed the powder therein;
   (B) a rotating shaft driving a main helical screw in said chamber, the screw forming the incoming powder into a cylindrical powder film on the inner surface of the chamber at the upper end portion thereof, said shaft having a longitudinal channel therein communicating with a nozzle formed in the screw;
   (C) an inlet constituted by a housing surrounding an annular slot in said chamber at a point under said upper end portion to introduce the liquid into said chamber to intermingle with the powder film to produce a paste which is shaped by the screw into a ribbon that is advanced helically toward the lower end of the chamber; and
   (D) pump means coupled to the said channel to draw air out of the space between the inner surface of the chamber and the screw to control the amount and size of air bubbles being entrained in the paste to an extent complying with the bubble requirements of the ultimate product, said pump means being constituted by a centrifugal pump driven by said shaft and mounted on the upper end thereof.

2. Apparatus as set forth in claim 1, in which the powder is flour and the liquid is a dough-producing solution.

3. Apparatus as set forth in claim 1, wherein said powder means includes a metering tube at the upper end of the chamber within which is a conical screw section driven by said shaft, said section being surrounded by a ring whose axial position is adjustable to set the size of this orifice defined between the ring and the section.

4. Apparatus as set forth in claim 1, further including an adjustable valve disposed at the junction of the pump and channel to adjust the suction force produced by the pump.

5. Apparatus as set forth in claim 1, further including a second inlet at a collection zone in said tube below the liquid inlet to introduce non-soluble ingredients into the chamber to be mixed by the screw with the paste.

6. Apparatus as set forth in claim 1, further including a second nozzle in said screw communicating with the channel, said second nozzle being disposed at a point in said chamber to draw air from the space between the chamber and the screw to assist in advancing the powder film toward the inlet slot.

7. Apparatus as set forth in claim 1, wherein said shaft extends above the chamber and is supported in a bearing.

8. Apparatus as set forth in claim 1, wherein said pump means is operated to inject gas into the paste.

* * * * *